Figure 1:
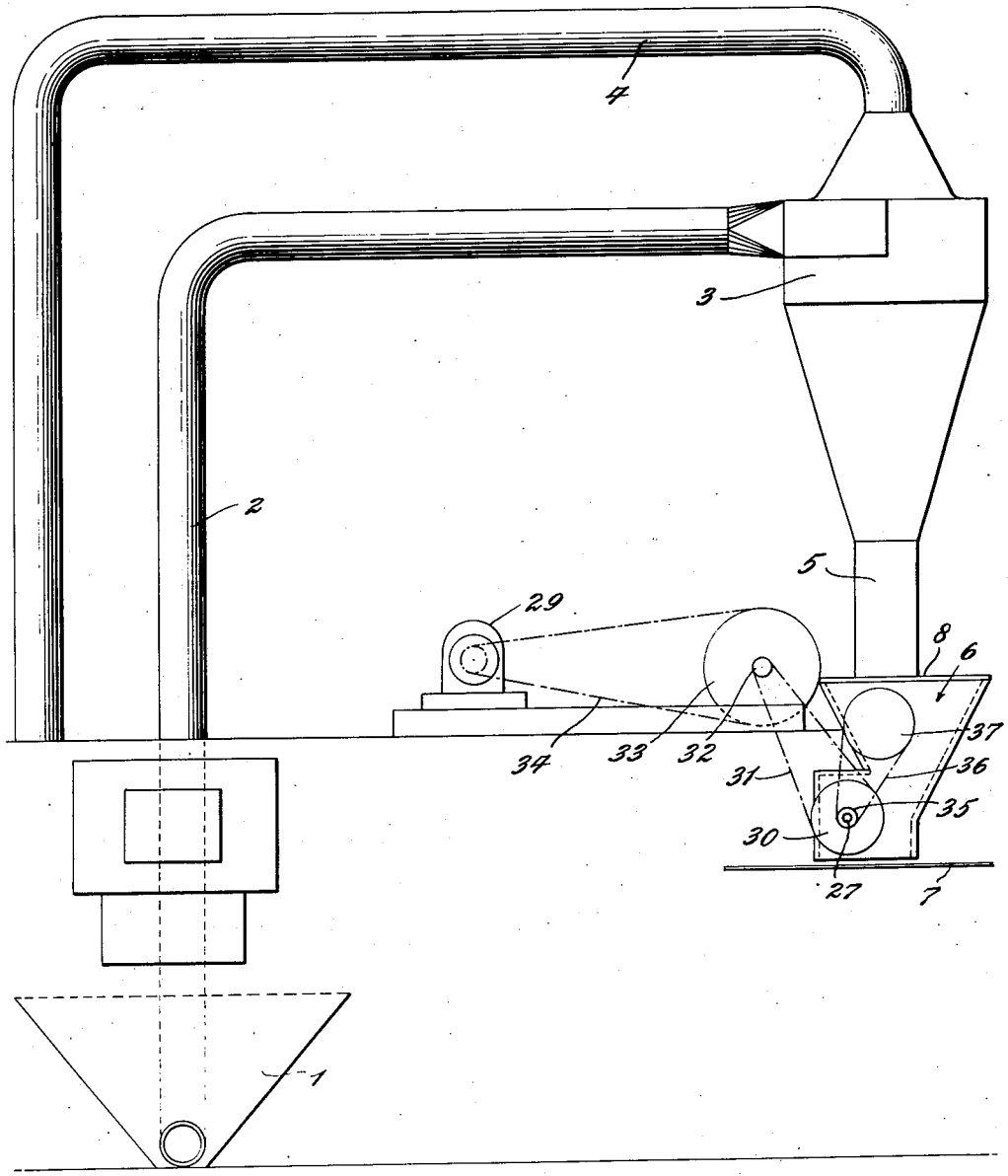

June 6, 1950   H. FOUNTAIN ET AL   2,510,625
FLOCK DISTRIBUTING APPARATUS
Filed Nov. 2, 1945   2 Sheets-Sheet 2
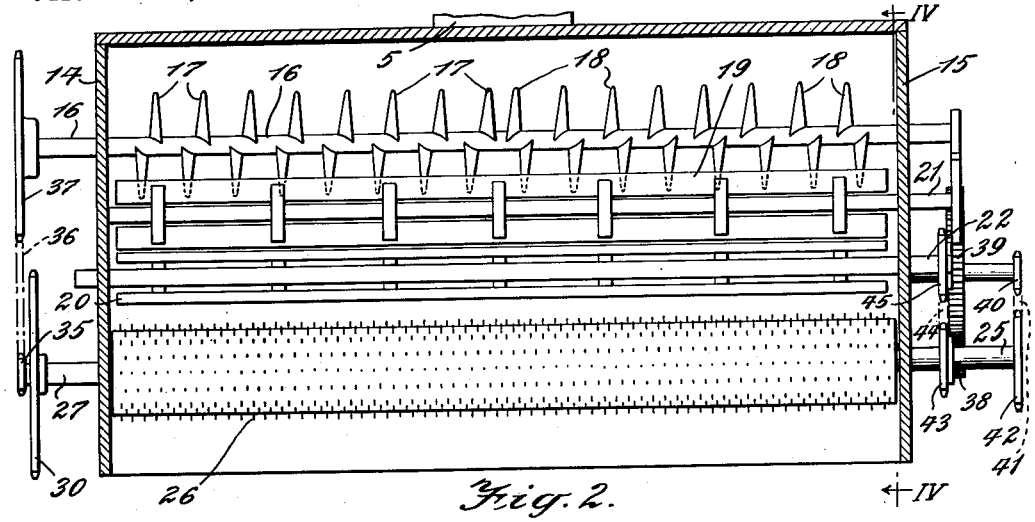
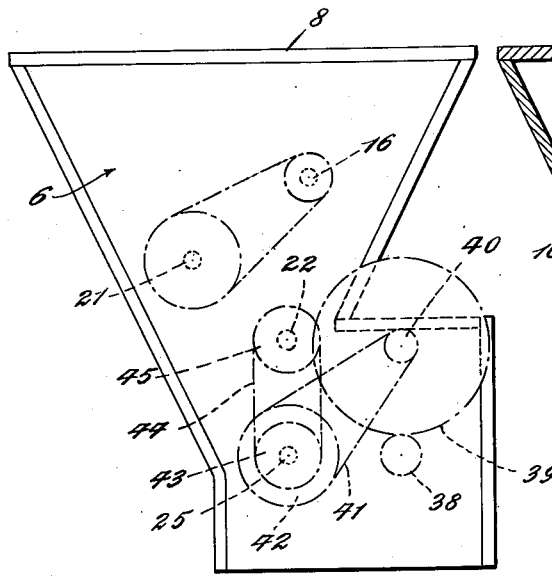
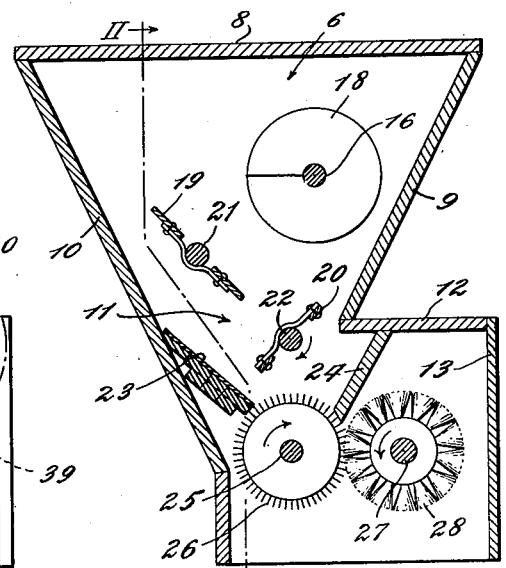
INVENTOR.
Harold Fountain
BY John J. Murphy
ATTORNEYS Patented June 6, 1950

2,510,625

UNITED STATES PATENT OFFICE 2,510,625

FLOCK DISTRIBUTING APPARATUS

Harold Fountain and John J. Murphy, Fall River, Mass., assignors to United Merchants & Manufacturers, Inc., Wilmington, Del., a corporation of Delaware Application November 2, 1945, Serial No. 626,268

6 Claims. (Cl. 91—8)

This invention relates to flock feeding apparatus of the general type appropriate for use in connection with the application of flock to adhesive-coated backing in the manufacture of simulated pile fabrics and the like.

It has for its primary object to provide an apparatus of this character which is so organized as to effect a satisfactorily uniform feed or distribution of flock and which is at the same time of relatively simple construction.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings, Fig. 1 is a diagrammatic, side elevational view of a form of apparatus embodying the invention; Fig. 2 is an enlarged sectional view of the flock distribution box, taken substantially on the line II—II of Fig. 4; Fig. 3 is an end elevational view of the box; and Fig. 4 is a sectional view on the line IV—IV of Fig. 2.

Referring first to Fig. 1 of the drawings, there is indicated a flock supply hopper 1 from which the flock is fed, as by a blower (not shown) through a duct 2 to a separator 3. The construction of the separator being well known and forming no part of the present invention, its details need not be described. It is sufficient for present purposes to note that the function of the separator is to separate from the flock supplied to it the smaller, unwanted particles and dust, which lightweight material is discharged from the top of the separator and carried off through duct 4, leaving the heavier, correct-size flock particles to fall by gravity into and through the duct 5. The latter opens into the top of the flock distribution box, generally designated 6, about midway of the length of the box (Fig. 2). As below described, the flock is passed through the distribution box and is discharged from its lower open end onto the fabric 7 to be coated.

Referring now to Figs. 2, 3 and 4, it will be noted that the box 6 has a relatively wide top 8 and side walls 9 and 10 which slope inwardly from the top to a reduced neck portion 11, the portion of the box below the neck being again enlarged by the walls 12 and 13. The end walls 14 and 15 of the box serve to support the several rotating members mounted within the box.

Adjacent the top of the box there is a spreader adapted to distribute the flock throughout the upper part of the box, the illustrated spreader taking the form of a rotatable shaft 16, carrying two sets of oppositely-arranged, helical flights 17 and 18, respectively, the shaft being rotated in a direction to spread the flock received from duct 5 outwardly from the center towards the ends of the box. The individual helical flights of each set correspond substantially to the shape of split washers disposed about shaft 16 as an axis.

Below the spreader and in the vicinity of the neck portion 11 of the box, means are provided for stirring the flock, such means preferably comprising a paddle or paddles rotatable to sweep a zone of a width substantially equal to the width of the box. In the form illustrated, two paddles 19 and 20 are shown mounted respectively on shafts 21 and 22, the shafts being offset and mounted one above the other.

Immediately below the neck portion 11 of the box there are mounted two baffles 23 and 24 converging toward their lower ends and one or both adjustable to provide a variable, restricted outlet from the upper to the lower section of the box.

Mounted on a shaft 25 in the lower part of the box is a cylindrical comb 26 which is of a diameter greater than the outlet formed by the baffles 23 and 24 and which is so positioned as to form a closure for such outlet. Mounted alongside the comb 26 on shaft 27 and in engagement with the comb is a cylindrical brush 28.

As shown in Figs. 1, 2 and 3, a motor 29 drives the brush shaft 27 through sprocket 30, chain 31, sprocket 32, pulley 33 and belt 34. By means of sprocket 35 on brush shaft 27, chain 36 and sprocket 37 on shaft 16, the spreader is rotated at a somewhat reduced speed. As shown in Fig. 3, the upper paddle shaft 21 is driven from the spreader shaft 16.

The comb shaft 25 is driven at a substantially reduced speed, compared to that of the brush shaft 27, through pinion 38 mounted on the brush shaft, gear 39, sprocket 40, chain 41 and sprocket 42. The lower paddle shaft 22 is driven at the same speed as the comb shaft, and in the same direction, by sprocket 43, chain 44 and sprocket 45. As indicated by the arrows in Fig. 4, the comb 26 and brush 28 are rotated in opposite directions and in a downward direction at their point of tangency.

In the operation of the apparatus, the flock is continuously distributed throughout the upper part of the box 6 by the spreader, and the paddles 19, 20 serve to prevent any undue accumulation or packing of the flock as it moves through the neck portion 11 to the restricted outlet between the lower ends of baffles 23 and 24. At this latter point, the comb 26 picks off a quantity of flock and transports it beyond baffle 24 into the lower section of the box where the brush 28, rotating at a substantially higher speed than the comb, removes the flock from the comb. The paddle 20, sweeping across the flock zone just above the comb, tends to insure greater uniformity in the amount of flock picked up by the comb and removed from it by the brush. As will be understood, the brush serves to impel or discharge the flock toward and through the lower end of the box with what might be termed a splattering action.

The moisture content of the applied flock may be suitably controlled but preferably by the introduction of hot, dry air into the duct 2, which arrangement is found to produce highly satisfactory results.

In the light of the foregoing description of a preferred embodiment of the invention, the following is claimed:

1. A flock distribution box having a relatively wide top and side walls sloping inwardly from the top to a reduced neck portion, a spreader comprising two sets of oppositely arranged helical flights located adjacent the top of the box and rotatable to spread flock outwardly from the center towards the ends of the box, a pair of rotatable paddles positioned to act on the flock passing toward said neck portion and adapted, together, to sweep a zone of a width substantially equal to the width of the box adjacent such neck portion, a rotatable, cylindrical comb located below the paddles, guide means for directing and confining the flock passed by the paddles to the comb, and a brush, rotatable in engagement with and faster than the comb, adapted to remove flock from the comb and discharge the same from the lower end of the box.

2. A flock distribution box having a relatively wide top and side walls sloping inwardly from the top to a reduced neck portion, a continuously rotatable spreader longitudinally disposed in the upper part of the box and extending from end to end thereof, said spreader serving to distribute flock outwardly from the center towards the ends of the box, a pair of rotatable paddles positioned to act on the flock passing toward said neck portion and adapted, together, to sweep a zone of a width substantially equal to the width of the box adjacent such neck portion, a rotatable, cylindrical comb located below the paddles, guide means for directing and confining the flock passed by the paddles to the comb, and a brush, rotatable in engagement with and faster than the comb, adapted to remove flock from the comb and discharge the same from the lower end of the box.

3. A flock distribution box having a relatively wide top and side walls sloping inwardly from the top to a reduced neck portion, a spreader rotatable to distribute flock throughout the upper part of the box, said spreader extending the entire length of the box and being disposed adjacent one side thereof, flock-stirring means positioned to act on the flock passing toward said neck portion, a rotatable, cylindrical comb located below the flock-stirring means, and a brush rotatable in engagement with the comb to remove and discharge flock therefrom, said brush being rotatable at a faster speed than the comb.

4. A flock distribution box having a relatively wide top and side walls sloping inwardly from the top to a reduced neck portion, a continuously rotatable spreader arranged within and substantially parallel to the top of the box for distributing flock outwardly from the center towards the ends of the box, flock-stirring means positioned to act on the flock passing toward said neck portion, a rotatable, cylindrical comb located below the flock-stirring means, adjustable guide means for directing and confining the flock passed by the flock-stirring means to said comb, and means for removing flock from the comb.

5. A flock distribution box having a reduced neck portion, continuously rotating helical flights above said reduced neck portion for distributing the flock as it passes towards the neck portion, rotatable paddle means positioned to act on the flock in the vicinity of said neck portion, a rotatable, cylindrical comb located below and adjacent the paddle means, and a brush rotatable in engagement with the comb to remove and discharge flock therefrom.

6. In flock-feeding and flock-distributing apparatus, the improvement which comprises a substantially vertically arranged housing for receiving flock from a flock-feeding means, said housing having a restricted passage section intermediate the upper and lower ends thereof, a continuously rotatable spreader longitudinally disposed in the upper part of the housing and extending from end to end thereof, said spreader serving to distribute flock outwardly from the center towards the ends of the housing, a cylindrical comb of a diameter greater than the width of the outlet of said restricted section positioned below said outlet to form a closure therefor, a cylindrical brush mounted alongside and in engagement with the comb beyond the said outlet, said comb and brush being rotatable in opposite directions such that at their point of tangency the direction of both is downward, said brush being rotatable at a faster speed than that of the comb, and flock-stirring means located above the outlet of the restricted passage section for rendering the flow of flock to said comb uniform and even.

HAROLD FOUNTAIN.
JOHN J. MURPHY.

REFERENCES CITED

The following references are of record in the file of this patent:

UNITED STATES PATENTS

| Number | Name | Date |
|---|---|---|
| 1,876,251 | Lehman | Sept. 6, 1932 |
| 2,176,835 | Cumfer | Oct. 17, 1939 |
| 2,285,650 | Faris et al. | June 9, 1942 |
| 2,321,082 | Harshberger | June 8, 1943 |
| 2,385,780 | Faris et al. | Oct. 2, 1945 |
| 2,385,781 | Faris et al. | Oct 2, 1945 |
| 2,402,986 | Cunning | July 2, 1946 |